United States Patent
Ooseki et al.

(10) Patent No.: US 6,319,130 B1
(45) Date of Patent: Nov. 20, 2001

(54) CHARACTER DISPLAY CONTROLLING DEVICE, DISPLAY CONTROLLING METHOD, AND RECORDING MEDIUM

(75) Inventors: Nobuhito Ooseki, Tokyo; Kiyohiko Yamane, Fujisawa; Kenichiro Honda, Tokyo, all of (JP)

(73) Assignee: Konami Co., Ltd. (JP)

( * ) Notice: Subject to any disclaimer, the term of this patent is extended or adjusted under 35 U.S.C. 154(b) by 0 days.

(21) Appl. No.: 09/381,942

(22) PCT Filed: Jan. 27, 1999

(86) PCT No.: PCT/JP99/00336

§ 371 Date: Sep. 27, 1999

§ 102(e) Date: Sep. 27, 1999

(87) PCT Pub. No.: WO99/38588

PCT Pub. Date: Aug. 5, 1999

(30) Foreign Application Priority Data

Jan. 30, 1998 (JP) .................................................. 10-019643

(51) Int. Cl.[7] ........................................................ A63F 13/00
(52) U.S. Cl. ........................... 463/43; 463/35; 434/307 A; 434/307 R
(58) Field of Search ................................ 434/307 A, 315; 463/31, 35, 43; 703/11

(56) References Cited

U.S. PATENT DOCUMENTS

| | | | |
|---|---|---|---|
| 4,827,519 | * 5/1989 | Fujimoto et al. | 381/42 |
| 4,994,987 | * 2/1991 | Baldwin | 364/518 |
| 5,630,105 | * 5/1997 | Itagaki | 395/501 |
| 5,803,747 | * 9/1998 | Sone et al. | 434/307 |
| 5,977,968 | * 11/1999 | Le Blanc | 345/339 |
| 6,056,555 | * 5/2000 | Tada | 434/307 |

FOREIGN PATENT DOCUMENTS

| | | |
|---|---|---|
| 04093872 | 8/1992 | (JP) . |
| 06250683 | 9/1994 | (JP) . |
| 08069282 | 3/1996 | (JP) . |
| 08293039 | 5/1996 | (JP) . |
| 09160574 | 6/1997 | (JP) . |
| 09297594 | 11/1997 | (JP) . |
| 6443398 | 3/1998 | (JP) . |

* cited by examiner

*Primary Examiner*—Jessica J. Harrison
*Assistant Examiner*—Alex F. R. P. Rada, II
(74) *Attorney, Agent, or Firm*—Bachman & LaPointe, P.C.

(57) ABSTRACT

Characters to be grown, growth factor data representing the growth degree of each character and background information for expressing background environment for each character are stored. According to a result of analysis of a sound characteristic of sound source data analyzed by an input data analyzing section 211, a background information processing section 213 or a character processing section 215 retrieves data for realizing a corresponding expression manner. An image managing section 220 produces CG images representing a character and background environment based on the data in question and allows them to be displayed on a screen, so that a game player can confirm musical taste of the game player by watching the images in the growth process of the character. As a result, there is provided a display control apparatus which can diversify an expression manner of images according to inputted sound source data and thus enhance attractiveness of a game.

22 Claims, 7 Drawing Sheets

CHARACTER DISPLAY CONTROLLING DEVICE, DISPLAY CONTROLLING METHOD, AND RECORDING MEDIUM

DESCRIPTION

1. Technical Field

The present invention relates to a display control technique for, for example, growing a figure expression ability of a character image-displayed on a display unit of a game apparatus or a display unit of a personal computer, based on music or the like selected by a game player.

2. Background Art

In recent years, various character growing games have been developed wherein characters are expressed by three-dimensional CG (computer graphic) images so that a game is played in a more realistic fashion.

Presently, in the character growing games, those games have been dominant wherein a game player breeds a designated character for multiplication, or an initial character is transfigured to a different character according to environment where it is bred. As the environment where a character is bred, i.e. as a growth factor of a character, a parameter digitizing the amount of feed or water, for example, is used. The game player enjoys while watching the growth process of a character, i.e. a manner in which a character image changes, by giving feed, water or the like to the character at given time intervals as if a human being bred a pet.

On the other hand, in the foregoing character growing games, the growth factor for growing a character is set in advance explicitly or secretly at the game designer side so that a game player can not voluntarily change the contents thereof. Therefore, a character growing manner by the game player and an expression manner of the character on a display unit are limited to within a range of the set growth factor so that it is not possible to create a more diversified expression manner or suitably reflect taste of the game player on the expression manner.

The present invention provides a character display control apparatus and method which can diversify an expression manner of a character image and reflect taste of a game player on the expression manner so as to enhance attractiveness.

Another object of the present invention is to provide a storage medium for realizing the foregoing display control apparatus on a computer.

DISCLOSURE OF THE INVENTION

For solving the foregoing problem, a first display control apparatus of the present invention is a display control apparatus which image-displays on a given display unit a growth process of a character which grows according to a sound characteristic such as a sound type, sound magnitude, rhythm or tune, the display control apparatus characterized by comprising a data holding means for holding growth factor data quantitatively representing a growth degree of a figure expression ability peculiar to the character; a data input means for inputting sound source data; a detection means for detecting a sound characteristic of the sound source data every time the sound source data is inputted; a data updating means for, according to the detected sound characteristic, cumulatively updating the growth factor data of the character being displayed on the display unit; and a control means for, based on the updated growth factor data, continuously changing an expression figure of the character being displayed.

The character to be displayed is, for example, one of a plurality of characters which are selectable based on identification information peculiar thereto. The data holding means is capable of identifying, when one of the characters is selected, growth factor data peculiar to the selected character. When wishing to manage the growth factor data for each of the plurality of characters, the data holding means includes an exchangeable memory storing the growth factor data per character and is capable of identifying the corresponding growth factor data from the memory.

The data input means may input sound source data from the exterior or may be capable of selectively inputting one of plural kinds of sound source data recorded in advance in the apparatus.

The detection means detects the sound characteristic by identifying a peak portion of a signal waveform of the sound source data, sampling it and applying a given arithmetic process to the sampled waveform. Alternatively, the sound characteristic is detected based on the frequency characteristic obtained by the arithmetic process.

When, for example, the detected sound characteristic is the same as one already held, the data updating means accumulates a continued time of the sound characteristic and changes the growth factor data in sequence according to the continued time or an accumulated time thereof.

The sound characteristic and the growth factor data can be composed of plural kinds of data distinguishable from each other. In this case, the data updating means changes in sequence growth factor data of a kind corresponding to a kind of a detected sound characteristic.

When wishing to change, in addition to the character, an image of background environment thereof, the first display control apparatus further comprises a background environment image managing means for relating background data for changing the background environment to the growth factor data and for displaying on the display unit the background environment based on the background data corresponding to the growth factor data upon expressing the figure of the character based on the growth factor data.

A second display control apparatus of the present invention is characterized by comprising an animation data storage means for storing animation data for image-expressing at least one of motion and expression of each of a plurality of characters which are selectively displayed on a given display unit, the animation data classified into a plurality of ranks; an allocating means for allocating a parameter to each of the plurality of characters, the parameter peculiar to each character and relating to a sound characteristic; a data input means for inputting sound source data; a detection means for detecting a sound characteristic of the sound source data every time the sound source data is inputted; a character selecting means for selecting one of the plurality of characters based on a given command; a data reading means for determining a rank corresponding to a degree of agreement between the parameter allocated to the selected character and the detected sound characteristic and for calling the animation data corresponding to the rank from the animation storage means; and a control means for controlling an expression manner of an image of the character displayed on the display unit based on the read animation data, wherein the motion or expression of the displayed character is changed according to the sound characteristic.

The animation data storage means stores a plurality of animation data per rank, and the data reading means reads, for example, the animation data of each rank at random.

The allocating means sets as the parameter one of a sound reproduction time based on the sound source data, a rhythm band of the sound source data and a tune which changes with a lapse of the sound reproduction time, or a combination of them, and includes a ranking factor for determining the rank. In this case, the data reading means determines the rank based on the ranking factor.

A third display control apparatus of the present invention is characterized by comprising an effect expression module for adding a given effect expression to a display manner of a character displayed on a given display unit: and a control means for displaying on the display unit an item of the effect expression module upon matching of a condition which enables startup of the effect expression module, for allocating startup data for starting the effect expression module to an input device designated upon the displaying, and for starting the effect expression module at a voluntary time point when a command is inputted via the input device.

The present invention further provides first to third display control methods and first to third storage media suitable for causing a computer to implement those display control methods.

The first display control method of the present invention is a method implemented in an apparatus which image-displays on a given display unit a growth process of a character which grows according to a sound characteristic such as a sound type, sound magnitude, rhythm or tune, the method characterized by holding growth factor data quantitatively representing a growth degree of a figure expression ability peculiar to each of characters to be displayed; detecting a sound characteristic of sound source data every time the sound source data is inputted into the apparatus; cumulatively updating, according to the detected sound characteristic, the growth factor data of the character being displayed on the display unit; and continuously changing an expression figure of the character based on the updated growth factor data.

When also changing background environment of the character image, for example, background data for changing the background environment is related to the growth factor data, and the background environment of the contents corresponding to the growth factor data is displayed on the display unit based on the background data upon expressing the figure of the character based on the growth factor data.

The second display control method of the present invention is a display control method for a plurality of characters which are selectively displayed on a given display unit, the method characterized by classifying animation data groups for image-expressing at least one of motion and expression of each character into a plurality of different ranks, holding them and allocating a parameter to each of the plurality of characters, the parameter peculiar to each character and relating to a sound characteristic; and detecting, upon every input of sound source data, a sound characteristic of the sound source data, calling the animation data of a rank corresponding to a degree of agreement between the detected sound characteristic and the allocated parameter, and changing a display manner of the character on the display unit according to the animation data.

The third display control method of the present invention is a method implemented in an apparatus which displays a character in a given display unit, the method characterized by displaying on the display unit, upon matching of a given condition, an item of an effect expression module for adding a given effect expression to a display manner of the character; allocating startup data for starting the effect expression module to an input device designated upon displaying the item; and starting the effect expression module at a voluntary time point when a command is inputted via the input device, so as to form the display manner on which the effect expression is reflected.

The first storage medium of the present invention is a storage medium storing program codes for causing a computer having a means for displaying on a given display unit an image of a character which grows according to a sound characteristic and an image of background environment thereof, and a means for inputting sound source data, to execute the following processes:

(1-1) a process of holding growth factor data quantitatively representing a growth degree of a figure expression ability peculiar to the character;

(1-2) a process of cumulatively updating, upon every input of sound source data, the held growth factor data according to a sound characteristic of the sound source data; and (1-3) a process of continuously changing an expression figure of the character displayed on the display unit based on the updated growth factor data.

The second storage medium of the present invention is a storage medium storing program codes for causing a computer having a means for displaying a character on a given display unit and a means for inputting sound source data, to execute the following processes:

(2-1) a process of classifying animation data groups for expressing at least one of motion and expression of the character into a plurality of different ranks, and holding them;

(2-2) a process of allocating a parameter peculiar to the character and relating to a sound characteristic;

(2-3) a process of detecting, upon every input of sound source data, a sound characteristic of the sound source data, and calling the animation data of a rank corresponding to a degree of agreement between the detected sound characteristic and the allocated parameter; and (2-4) a process of changing the motion or expression of the character on the display unit to a manner corresponding to the called animation data.

The third storage medium of the present invention is a storage medium storing program codes for causing a computer having a means for displaying a character on a given display unit and a means for inputting sound source data, to execute the following processes:

(3-1) a process of displaying on the display unit, upon matching of a given condition, an item of an effect expression module for adding a given effect expression to a display manner of the character;

(3-2) a process of allocating startup data for starting the effect expression module to an input device designated following the display of the item; and (3-3) a process of starting the effect expression module at a voluntary time point when a command is inputted via the input device.

BEST MODE FOR CARRYING OUT THE INVENTION

Hereinbelow, carrying-out modes will be described wherein the present invention is applied to a video game apparatus.

(First Carrying-out Mode)

In this carrying-out mode, there is given an example of a video game apparatus which displays on a display unit the growth process of a character that grows resulting from sound characteristics. "Sound characteristics" referred to herein represent, for example, sound type, sound magnitude, rhythm, tune, sound frequency, frequency fluctuation and so on, and in case of musical piece data, also include genre, matching of voices relative to a musical piece, the distinction of sex of a pronouncer and so on.

It is assumed that a character and its background environment displayed on a display unit are CG images in the form of polygons and that motion of the character, expression thereof and change of a figure thereof in the growth process, and change of the background environment etc. of the character are realized by program codes for changing the shape of each polygon, and growth factor data, background data and other changing parameters. It is assumed that these program codes etc. are stored in advance in a CD-ROM as one example of a storage medium of the present invention along with program codes for realizing a video game apparatus on a computer (hereinafter will they be collectively referred to as "game program").

Here, "growth factor data" represents a parameter that quantitatively represents a growth degree of a figure expression ability, peculiar to a character, composed of at least one of rhythmical sense, dancing technique, matching, physical strength, intelligence and singing skill, and thus can indirectly express the foregoing intelligence etc. of a game player via the character in question. The growth factor data is managed per character and its contents (quantitative data) are set to be cumulatively increased/decreased depending on inputted sound source data such as a sound characteristic of a musical piece which the game player having selected the character in question listens to.

"Background data" represents a parameter for changing background environment of a character and is associated with the growth factor data. Specifically, it is arranged that different background information is selected depending on the contents of the growth factor data.

In the present invention, since a source of sound exhibiting the foregoing sound characteristic becomes a question, an expression of "sound source data" is used as data representing sound. Specifically, the sound source data include musical piece data representing sound characteristics of a musical piece based on musical instruments etc., voice data representing human uttering sound characteristics, effect sound data representing effect sounds, and so on. If only the presence/absence of sound (source) becomes a question, it may be simply referred to as "sound source".

[Game Apparatus Body]

First, a game apparatus body for constituting a video game apparatus of this carrying-out mode will be described.

As the game apparatus body, one described in, for example, Laid-open Patent Publication No. 8-212377 can be used.

Figure 1:
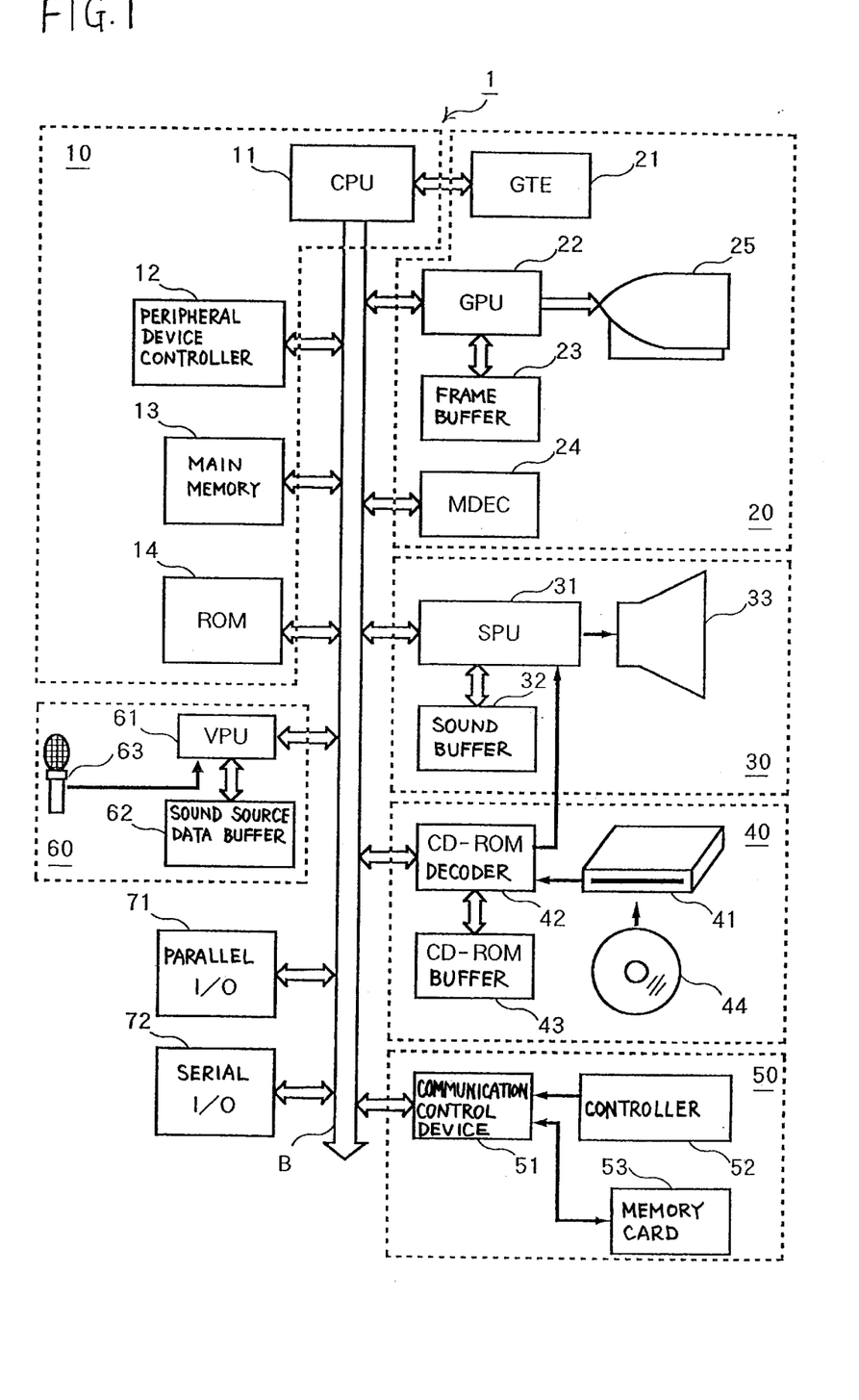
FIG. 1 is a hardware structural diagram showing an example of a game apparatus body to which the present invention is applied.

Specifically, the game apparatus body reads the game program from the foregoing CD-ROM which is exchangeable, and executes it so as to produce CG images, display them and control the displaying. An example of concrete configuration therefor is as shown in FIG. 1, wherein a game apparatus body 1 comprises a main control section 10, an image processing section 20, a sound processing section 30, a disk control section 40, a communication control section 50 and a main bus B connecting the foregoing functional blocks 10 to 50 to allow two-way communications among them.

The main control section 10 comprises a CPU 11, a peripheral device controller 12 for carrying out an interrupt control, a DMA (direct memory access) transfer control, etc., a main memory 13 for temporarily storing the game program etc., and a ROM 14 storing an operating system (OS) etc. for generally managing or controlling various portions of the apparatus.

The CPU 11 is a RISC (reduced instruction set computer) CPU and realizes a plurality of later-described functions based on the OS stored in the ROM 14 and the game program stored in the main memory 13.

The image processing section 20 comprises a geometry transfer engine (GTE) 21 carrying out high-speed coordinate transformation etc. of data to be displayed, a graphics processing unit (GPU) 22 for drawing CG images (character and its background environment etc.) composed of combinations of polygons, sprites (polygonal shape such as triangular shape or quadrangular shape) and the like according to drawing commands from the CPU 11, a frame buffer 23 for temporarily storing the CG images drawn by the GPU 22, and an image decoder (MDEC) 24 for decoding image data as requested. The display unit 25 reads the CG images stored in the frame buffer 23 to display them.

By consecutively executing the drawing by the GPU 22 and the storing into the frame buffer 23, the CG images including motion image elements can be displayed on the display unit 25.

The sound processing section 30 comprises a sound reproduction processor (SPU) 31 for producing voices, music sounds, effect sounds, etc. according to the sound source data, a sound buffer 32 for temporarily storing data of voices, music sounds, effect sounds, etc., and a loudspeaker 33. The SPU 31 has an ADPCM decoding function of, for example, reproducing sound source data subjected to adaptive differential pulse code modulation (ADPCM), a function of reproducing data stored in the sound buffer 32 as it is, and a function of modulating and reproducing data stored in the sound buffer 32, so that these functions can be selectively used automatically depending on the format of the data to be reproduced.

The disk control section 40 comprises a disk drive 41 for reproducing the game program stored in a CD-ROM 44 so as to be recognized by the CPU 11 (hereinafter, data reproduced will be referred to as "reproduced data"), a CD-ROM decoder 42 for decoding the reproduced data when error correcting codes (ECC) are added thereto, and a CD-ROM buffer 43 for temporarily storing the reproduced data from the disk drive 41 before storing them into the main memory 13. The decoder 42 also constitutes a part of the sound processing section 30. Among outputs from the decoder 42, those relating to the sound source data are inputted into the SPU 31.

The communication control section 50 comprises a communication control device 51 for controlling communication with the CPU 11 via the main bus B, a controller 52 for receiving commands from the game player, and a memory card 53 as one example of an exchangeable memory.

The controller 52 is an interface for commanding the will of the game player, such as game start, game interruption, character selection, input of sound source data, sound reproduction and so on, and for selection among various displayed menus or items, and so on. The commanded or selected data is transmitted to the communication control device 51 in synchronous communication.

The communication control device 51 transmits data representing the command contents (command data) sent from the controller 52, to the CPU 11. In this manner, the will of the game player is notified to the CPU 11 so that the CPU 11 can implement the processing corresponding to the will of the game player based on the game program being executed. The communication control device 51 also has a function of storing data into the memory card 53 and reading the stored data.

A sound source input section 60 serves to receive an input sound from the exterior, such as a voice inputted via a microphone 63, and gives it to the sound processing section 31 etc., and comprises a voice processor (VPU) 61 and a sound source data buffer 62.

The VPU 61 has an ADPCM decoding function similar to that of the foregoing SPU 31, a function of reproducing data stored in the sound source data buffer 62 as it is, a function of modulating and reproducing data stored in the sound source data buffer 62, and so on. Given such functions, the sound source input section 60 can be used as a sampling sound source.

The sound source input section 60 can also serve to function as a sampling sound source in cooperation with an external sound processing apparatus or the like. For example, an audio apparatus for reproducing a musical piece or instrument sounds or a sound processing apparatus of a singing play unit system or the like can be connected via a port of a parallel input/output (I/O) 71 or a serial input/output (I/O) 72 connected to the main bus B, so as to input a musical piece or the like from the connected sound processing apparatus via the microphone 63 or a non-shown external input terminal.

If it is necessary to store the settings of the progressing game or the results of the game at the end of the game or while the game is in progress, the CPU 11 transmits various data on that occasion to the communication control device 51. The communication control device 51 stores the transmitted data from the CPU 11 into the memory card 53. Since the memory card 53 is separated from the main bus B, it can be attached or detached with the power being supplied. This allows the game settings etc. to be stored into a plurality of memory cards 53.

The game apparatus body 1 is allowed to communicate with another video game apparatus or the like via the serial I/O 72.

[Video Game Apparatus]

In the game apparatus body 1 having the foregoing structure, when the power gets on or a reset process is executed while the CD-ROM 44 is loaded in the disk drive 41, the CPU 11 executes the OS stored in the ROM 14. When the OS is executed, the CPU 11 Initializes the whole apparatus by confirming its operation etc., then controls the disk control section 40 to load the game program stored in the CD-ROM 44 into the main memory 13 and then executes it. In this event, image expression data is also read out as requested. Through the execution of the game program, the CPU 11 forms functional blocks as shown in FIG. 2 to realize a video game apparatus 2.

Figure 2:
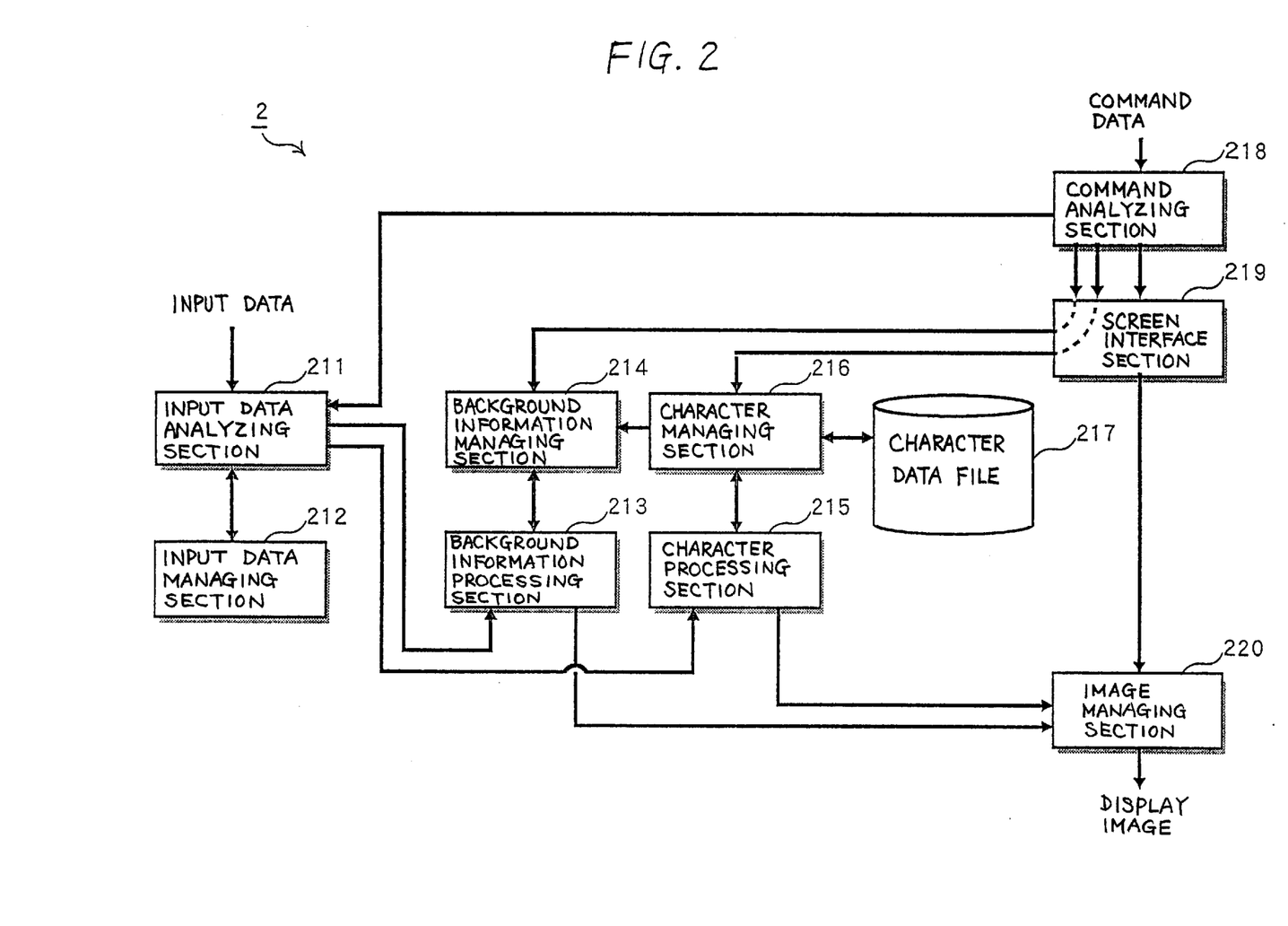
FIG. 2 is a functional block diagram showing a structural example of a video game apparatus according to a first carrying-out mode of the present invention.

As shown in FIG. 2, the video game apparatus 2 comprises functional blocks of at least an input data analyzing section 211, an input data managing section 212, a background information processing section 213, a background information managing section 214, a character processing section 215, a character managing section 216, a character data file 217, a command analyzing section 218, a screen interface section 219 and an image managing section 220. Hereinbelow, the processing contents implemented by these functional blocks will be described.

<Detection Process for Sound Characteristic etc.>

The input data analyzing section 211 mainly analyzes (detects) a sound characteristic of sound source data inputted via the VPU 61, sound source data from the CD-ROM decoder 42 (sound source data stored in the CD-ROM 44) or specific sound source data inputted from the later-described input data managing section 212, and inputs an analysis result into the background information processing section 213 or the character processing section 215. Among the sound source data whose sound characteristics have been analyzed, those whose reproduction is commanded by the game player are outputted to the sound processing section 30 as requested.

Various techniques may be adopted for the sound characteristic analyzation.

For example, certain one or two measures in sound source data to be processed are sampled to analyze a period of rhythm and thereby to identify a type the sound source data in question belongs to, i.e. a genre, which is then set as one of sound characteristics. This process pays an attention to the fact that a number of rhythm section instruments are used in association with signal waveform peak portions in sound source data, so as to identify a genre of the sound source data in question from the formation of the rhythm section instruments identified by the analysis. There is a case, however, that the genre identification can not be fully achieved only by the foregoing analysis. In this case, a characteristic portion of the sound source data is locally captured by applying given filtering to the sound source data, so as to assist the analysis.

Through the foregoing analyzing technique, it is possible to easily identify genres, such as rock/pops, bossa nova, fusion, jazz, march, waltz, techno and reggae.

With respect to those genres whose rhythm itself is difficult to identify, such as classical, ambient and new age sound, the frequency characteristic is detected based on signal waveforms of the sound source data analyzed at the input data analyzing section 211, thereby to determine a genre based on a result of the detection. For example, a genre is determined by judging 1/f (f: frequency) fluctuation and resemblance or correlation to frequency characteristics of known α wave, β wave and the like.

Further, by analyzing a particular waveform in the sound source data, music formation, phoneme, tune, sound magnitude, the degree of "matching" of voices relative to a musical piece based on a change in music magnitude, the distinction of sex of a pronouncer or the like may be identified so that the identified information is set as a sound characteristic. This can be realized, for example, by loading a reference signal waveform in advance in the main memory 13 or the like, or directly reading from the CD-ROM 44 and by applying the Fourier transformation (FFT) to quantitatively judge the resemblance degree between two signal waveforms of the sound source data and the reference.

The analysis result of the sound characteristic may be, for example, visualized in the form of a graph or the like so as to be presented to the game player in real time via the image managing section 220, or displayed on a measuring device such as a spectrum analyzer or an oscilloscope.

The input data analyzing section 211 further performs detection of synchronization between the period of rhythm analyzed in the foregoing manner and the button input timing of the game player via the controller 52, as a part of the sound characteristic analyzation. For example, when the game player carries out a button input via the controller 52 in time to the rhythm of sounds now listening to, it is quantitatively detected how correctly the button input has been carried out. The detection result is inputted into the character processing section 215. The input data analyzing section 211 further has a function of recognizing the designation contents about a character, background environment or the like inputted by the game player via the microphone 63. The recognized designation contents are inputted into the background information processing section 213 or the character processing section 215.

<Managing Process for Recorded Sound Source Data>

Sound source data such as musical piece data may be recorded in advance in the game apparatus so as to be read out as requested according to commands of the game player. Specifically, musical piece data, for example, obtained from music CDs, are recorded in the input data managing section 212 and managed in such a manner as to be readable as requested using a known TOC (table of contents). To be concrete, information, such as the number of musical pieces, names of musical pieces, names of artists of individual musical pieces and reproduction time, is linked with the recorded musical piece data and, when, for example, a name of a musical piece or a name of an artist is designated by the game player, corresponding musical piece data is retrieved and inputted into the input data analyzing section 211.

<Processing about Background Environment Image>

The background information processing section 213 implements processing for changing a display of a background environment image of a character, cooperatively with the background information managing section 214. The background information managing section 214 manages necessary background information upon execution of the foregoing processing. This background information is, for example, extracted from changing parameters (background data in this case) which are read upon execution of the game program, and held in a non-shown memory area.

Concrete operations of the background information processing section 213 and the background information managing section 214 become as follows:

When a sound characteristic is inputted from the input data analyzing section 211, the background information processing section 213 sends to the background information managing section 214 a read command for background information corresponding to the inputted sound characteristic. The background information managing section 214 reads the corresponding background information and sends it to the background information processing section 213. This background information is sent to the image managing section 220 from the background information processing section 213.

The background information managing section 214 also sends to the background information processing section 213 background information designated by the game player via the screen interface section 219 or the microphone 63. As described later, the background information managing section 214 also sends particular background information to the background information processing section 213 in response to a command from the character managing section 216.

<Processing about Character Image>

The character processing section 215 implements processing for changing a display manner of a character image, particularly a display figure of a character image in the growth process, cooperatively with the character managing section 216. The character managing section 216 manages data for determining a display figure of a character image. The character data file 217 stores figure forming elements of a plurality of character images, growth factor data for individual characters, and quantitative data corresponding to sound characteristics, such as a judging table for deriving numerical values or coefficients.

When a sound characteristic is inputted, the judging table is used for quantifying the inputted sound characteristic and cumulatively reflects it on the previous growth factor data. More simply, if the growth factor data is represented by a numerical value as one example of quantitative data and the sound characteristic is presence/absence of a sound (source), the judging table is used for increasing a numerical value of the growth factor data every time a sound characteristic is inputted. In practice, the genres include rock/pops, bossa nova, fusion, jazz, march, waltz, techno, reggae and so on, and the sound characteristics include music formation, phoneme, tune, sound magnitude, the degree of "matching" of voices relative to a musical piece based on a change in music magnitude, the distinction of sex of a pronouncer and so on. Thus, the quantitative data is determined in a manner which can fully identify them. For example, the unit of a numerical value differs per genre, a numerical value is reduced with respect to a particular genre, or a different coefficient is determined per genre. Similar weighting is carried out with respect to the other sound characteristics. The degrees of weighting are set in advance corresponding to uses or the like.

In this carrying-out mode, since the figure expression abilities of each character, such as rhythmical sense, dancing technique, matching, physical strength, intelligence and singing skill, are synthetically handled as the growth factor data, the quantitative data is determined in a manner which can individually identify them. For example, in case of "rhythmical sense", the foregoing detection result on the synchronization between the period of rhythm and the button input timing of the game player via the controller 52 is used as quantitative data, and the rhythmical sense is set to increase as the synchronization increases. In case of "intelligence", the input frequency of sound source data is used as quantitative data. Specifically, the intelligence is set to increase as the number of times the game player listens to certain sounds such as musical pieces increases, irrespective of the type of music. In case of "dancing technique", the type of a musical piece of sound source data is used as quantitative data. Specifically, if it is reggae, the dancing technique for reggae is set to increase. In case of "matching", the resemblance degree between the reference signal waveform and the signal waveform extracted from the sound source data is used as quantitative data, wherein the matching is judged better as the resemblance degree increases.

The judging table may be provided in the character managing section 216. Further, the growth factor data per character may be stored in the memory card 53, and may be read upon playing the game by loading the memory card 53 into the game apparatus body 1.

Concrete operations of the character processing section 215 and the character managing section 216 become as follows:

Every time a sound characteristic is inputted from the input data analyzing section 211, the character processing section 215 commands the character managing section 216 to read figure forming elements (polygon data etc. of a CG image) of a character for carrying out a figure expression corresponding to growth factor data at that time point.

Based on the command from the character processing section 215, the character managing section 216 reads the corresponding figure forming elements from the character data file 217 and sends them to the character processing section 215. The read figure forming elements are sent to the image managing section 220 from the character processing section 215 in sequence.

Further, every time the sound characteristic is inputted, the character managing section 216 implements processing for cumulatively reflecting it on growth factor data of a character image in question in the foregoing judging table. Alternatively, if an input of the same sound characteristic continues over a plurality of time periods, processing is for cumulatively reflecting growth factor data relating to the sound characteristic in the next time period onto growth factor data in the previous time period. Specifically, according to quantitative data corresponding to the sound characteristic, such as a numerical value defined in the judging table, a corresponding factor (data representing an individual figure expression ability such as intelligence or dancing technique) of the previous growth factor data is updated as requested. Upon updating, a value may be increased or decreased. When the same sound characteristic is repeatedly inputted, a value of a corresponding portion in the growth factor data is normally increased. The character managing section 216 extracts figure forming elements corresponding to the contents of the thus cumulatively updated growth factor data from the character data file 217 and sends them to the character processing section 215.

Accordingly, a character is displayed on the display unit 25 in the manner which reflects, for example, musical taste of the game player. Further, every time a particular sound characteristic is repeatedly inputted or continues to be inputted, growth factor data relating to the sound characteristic in question changes cumulatively so that an expression figure of a character grows in sequence. As a result, the game player can objectively see by means of CG images the process in which a character grows according to sound source data selected by the game player.

Every time the growth factor data reaches a given value, the character managing section 216 sends given command data to the background information managing section 214. This is for displaying a background environment image corresponding to the contents of the growth factor data on the display unit.

When identification information for certain one of a plurality of characters is commanded from the game player via the screen interface section 219, the character managing section 216 sends figure forming elements corresponding to growth factor data at that time point for the character in question, to the character processing section 215.

<Analyzing Process for Command from Game Player>

The command contents from the game player are analyzed at the command analyzing section 218.

Specifically, when command data is inputted from the controller 52 via the foregoing communication control device 51, the command analyzing section 218 decodes the contents of the command data and implements required data processing. The command data includes designation by the game player of a character to be displayed, and so on. For example, if a particular character is designated at the start of the game or the like, the command analyzing section 218 causes the character managing section 216 to read growth factor data of the character set as a default value from the character data file 217 and to send it to the image managing section 220 via the character processing section 215. This allows a predetermined character image to be displayed on the display unit 25.

Upon recognizing the start or restart of the game, the command analyzing section 218 loads the game program in the CD-ROM 44 and saved data in the memory card 53 into the main memory 13 so as to arrange the environment necessary for execution of the game. Further, the command analyzing section 218 also has a function of saving a progressing state of the game, figure forming elements of a currently displayed character and background information into the memory card 53 upon recognizing the game interruption.

<Image Display Process>

The screen interface section 219 and the image managing section 220 are concerned with a process of image displaying onto the display unit 25. The screen interface section 219 prepares various menu images and items for allowing the game player to easily input the will of the game player via the controller 52 and sends them to the image managing section 220. In addition to what concerns manipulation of a character by the game player, the screen interface section 219 prepares, for example, a character selecting menu image for allowing the game player to select a desired character, items and a later-described character setting menu image.

The image managing section 220 produces a CG image for a display using background information, figure forming elements of a character and the foregoing GTE 21 and GPU 22 and displays it on the display unit 25. Further, the image managing section 220 suitably displays on the display unit 25, for example, a menu image such as a character selecting menu image, items, a window for displaying character introducing data or the like.

[Display Control 1 of Character etc.]

Now, a display control method implemented by the video game apparatus 2 in this carrying-out mode will be described with reference to FIGS. 3 and 4.

<Selection of Character etc.>

Figure 3:
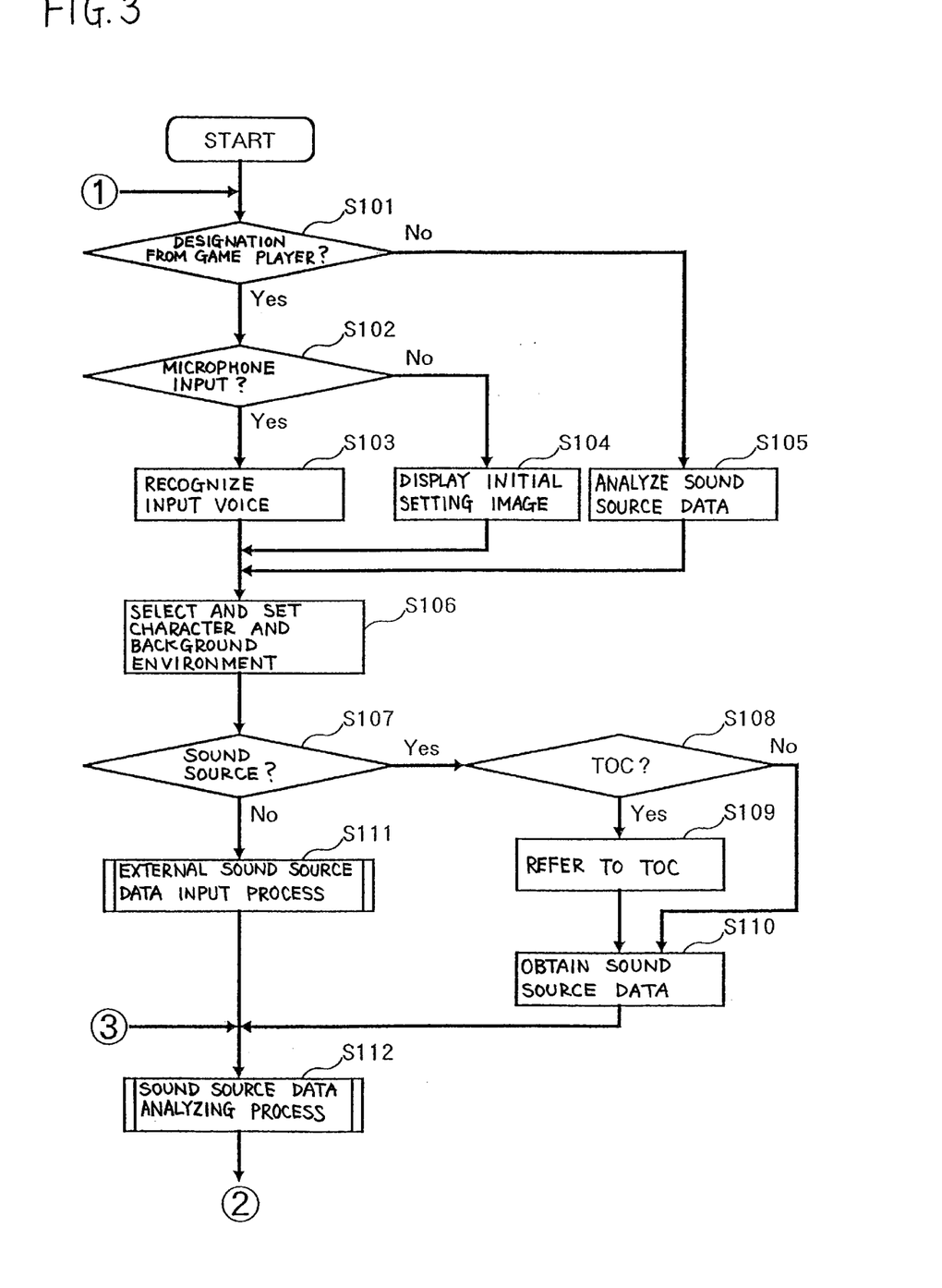
FIG. 3 is a diagram of a processing sequence in the video game apparatus of the first carrying-out mode.

In FIG. 3, when the game start (or restart) is commanded from the game player via the controller 52, the command analyzing section 218 judges whether there is explicit character designation from the game player (step S101). There are two designation modes from the game player. One is a microphone input mode, and the other is a mode carried out via the screen interface section 219. In case of the designation from the game player through the microphone input, a recognition process for a voice inputted via the microphone 63 is implemented (step S101: Yes, S102: Yes, S103), and a character and its background environment corresponding to the contents thereof are set (step S106).

In case of the designation from the game player not through the microphone input (step S101: Yes, S102: No), a given initial setting image is displayed on the display unit 25 (step S101: Yes, S102: No, S104). When setting data is inputted via the screen interface section 219, a character and its background environment corresponding to the setting data are set (step S106).

If there is no designation from the game player, it means that sound source data is inputted. Thus, a sound characteristic of the sound source data is analyzed, and a corresponding character and its background environment are automatically set based on a result of the analysis (step S101: No, S105, S106).

<Input•Analysis of Sound Source Data to be Growth Factor>

After the character and the background environment are set and an image is displayed on the display unit 2, the input data analyzing section 211 judges whether there is a sound source to be a growth factor of the character in the game apparatus. If there is no sound source (step S107: No), an input process for sound source data from, for example, the CD-ROM decoder 42 is executed (step S111). On the other hand, if there is the sound source (step S107: Yes), it is checked whether it is recorded in the TOC. If it is recorded (step S108: Yes), the TOC is referred to so as to retrieve recorded sound source data (step S109, S110). If it is not recorded in the TOC, the sound source data is directly obtained, not via the TOC (step S108: No, S110). A sound characteristic of the thus obtained sound source data is analyzed at the input data analyzing section (step S112).

Figure 4:
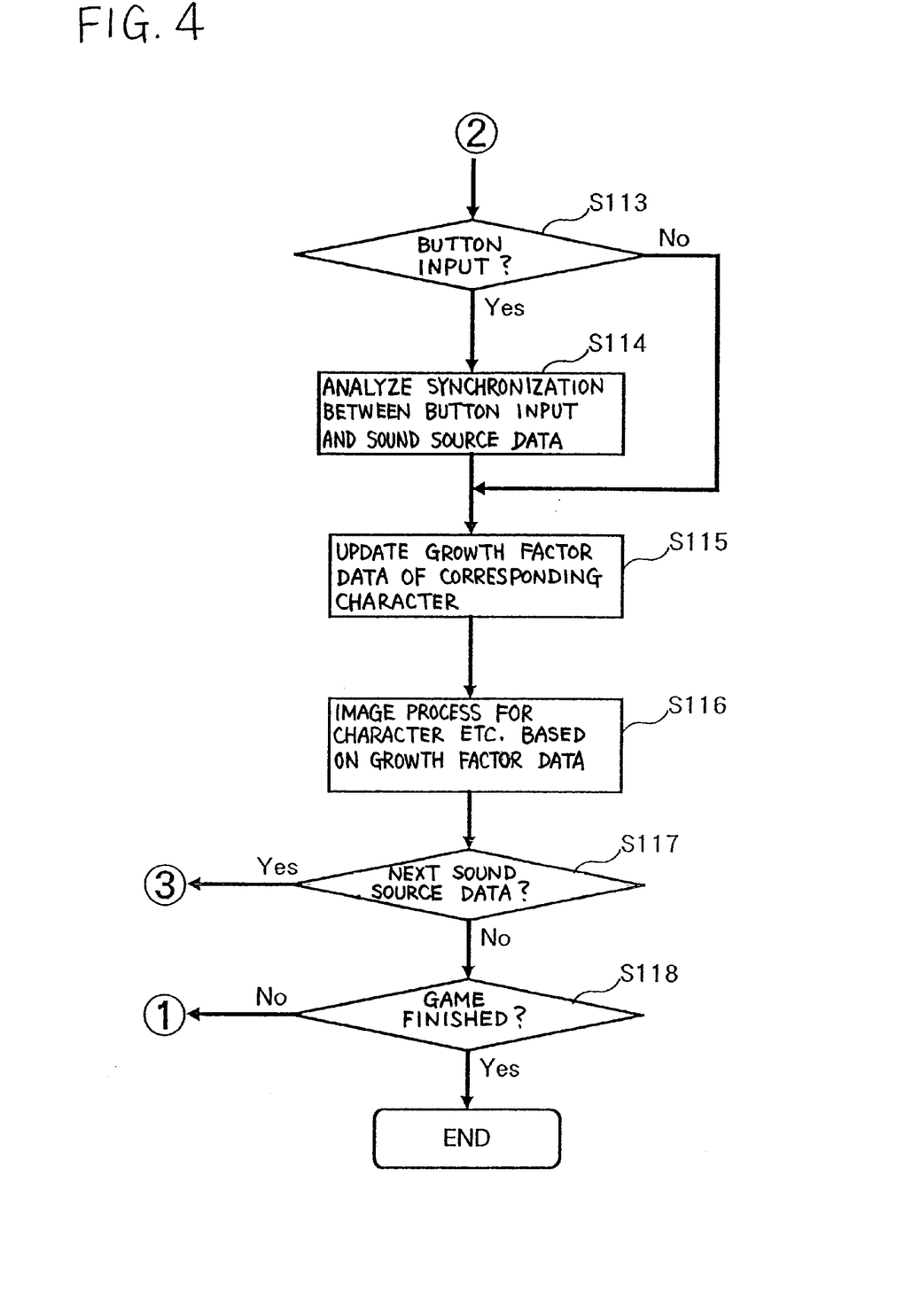
FIG. 4 is a diagram of a processing sequence in the video game apparatus of the first carrying-out mode.

Referring to FIG. 4, if a button input from the controller 52 corresponding to the inputted sound source data is detected (step S113: Yes), the input data analyzing section 211 detects the state of synchronization between the button input timing and the rhythm of the sound source data (step S114) and sends an analysis result of the synchronization state to the character managing section 216 via the character processing section 215. If there is no button input from the game player, only a result of the analysis of the sound source data at the foregoing step S112 is sent to the character managing section 216 via the character processing section 215 (step S113: No). The character managing section 216 updates growth factor data for the corresponding character, retrieves figure forming elements of the character and background information based on the updated growth factor data, and sends them to the image managing section 220 via the character processing section 215. Thus, an image process for the character etc. is carried out (step S116).

If there is next sound source data, the process at step S112 is executed (step S117: Yes).

The foregoing processing is repeated until the end of the game is commanded via the controller 52 (step S118: No). If the end of the game is commanded, data save is performed if necessary and the processing is finished (step S118: Yes).

If interruption during the game is commanded via the controller 52, data save into the memory card 53 is carried out if necessary. Upon restarting the game, the saved data for the game player concerned is read from the memory card 53 and an image corresponding to the character at the time of interruption is displayed. This allows the game player to restart the game from the time point of interruption.

The selection of the character and the background at the foregoing steps S101 to S106 can be carried out upon occasion.

<Image Display Example>

Now, concrete examples of display images of a character and background which are displayed on the display unit 25 via the image managing section 220 will be described with reference to FIGS. 5 to 7.

Figure 5:
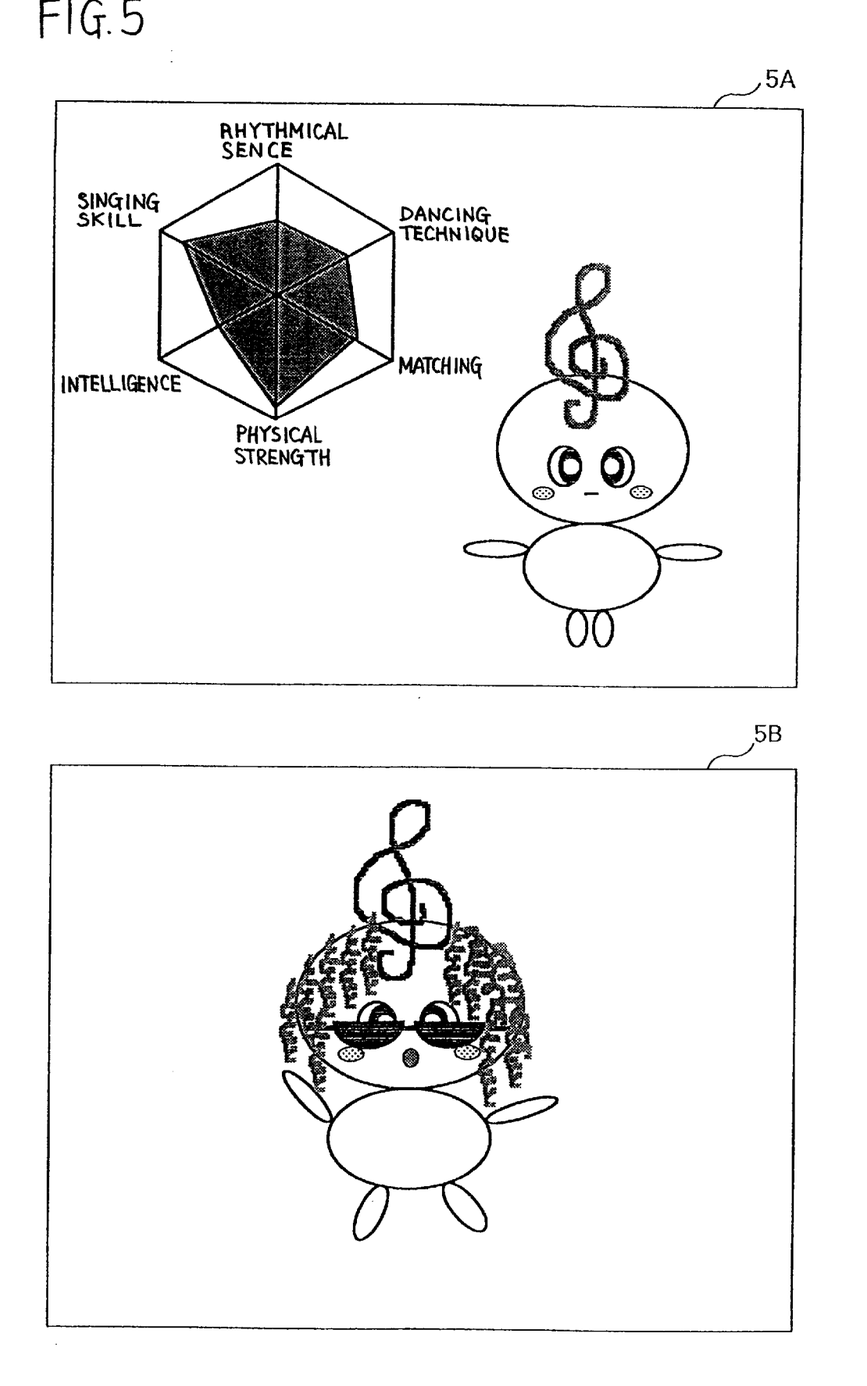
FIG. 5 is a diagram showing one example of a display image according to the first carrying-out mode.

Sign 5A in FIG. 5 denotes a character setting image at the foregoing step S104. In the setting image 5A, a character (lower-right in the figure) and current growth factor data (upper-left in the figure) corresponding to the character in question are displayed. At the time of initial setting, the growth factor data is displayed with initial values.

Sign 5B in FIG. 5 denotes a display image showing an example of a change in expression figure when the game player repeatedly or continuously inputs sound source data relative to the character in sign 5A. The display image 5B shows the state wherein a sound characteristic (genre) analyzed at the input data analyzing section 211 is "reggae" so that the character image is changed (grown) to "reggae" and performing a reggae dance. Further, in this example, as compared with the character in the setting image 5A, a symbol shown as "G clef" at the head of the character becomes darker so as to represent that the character is grown based on the sound source data.

When the same reggae sound source data is continuously inputted over a plurality of time periods, growth factor data corresponding to a sound characteristic of the sound source data in question is cumulatively reflected per time period so that the initial expression figure of the character in the display image 5A gradually grows as the character image in the display image 5B.

Figure 6:
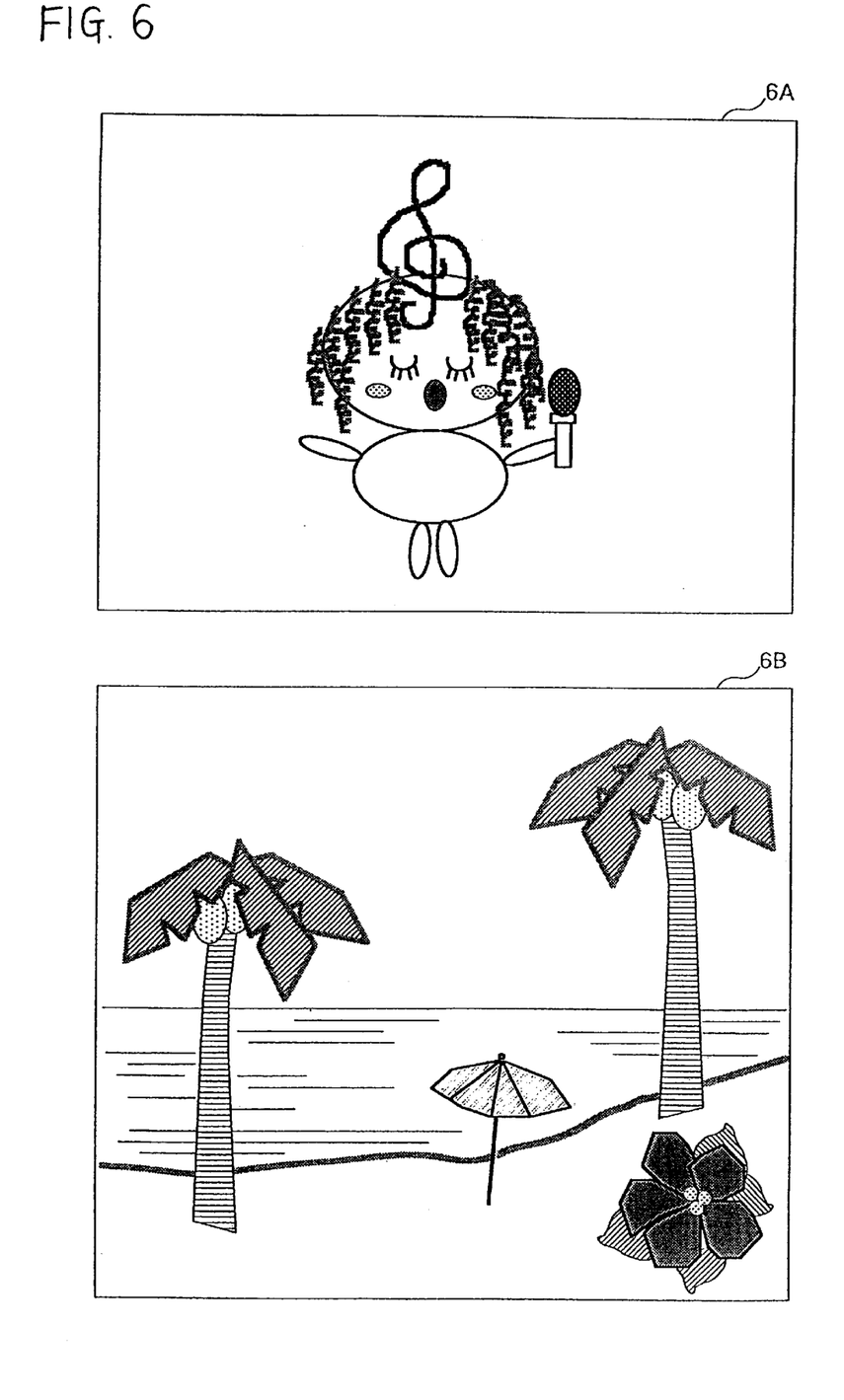
FIG. 6 is a diagram showing one example of a display image according to the first carrying-out mode.

Sign 6A in FIG. 6 denotes a display image showing a figure of a character singing. This character figure is formed in association with, for example, a command from the game player at the foregoing step S102 or sound source data obtained during the processing at step S111. In this event, for example, as sound source data with much vocal are inputted more, "power of expression" of the growth factor data is set to be increased. Further, by judging, upon analyzing a sound characteristic, to what degree the reference signal waveform and a signal waveform of the inputted sound source data resemble each other, expression or behavior of the character image can be changed. In the shown example, since the resemblance degree between the signal waveforms is less than a threshold value, i.e. the interval or rhythm is not correct, the character image exhibits rather disgusted expression.

Sign 6B in FIG. 6 denotes a display image showing the state wherein background environment therein has been changed. This background environment changes, for example, with respect to a preset default value based on designation from the game player at the foregoing step 103 or 104 or a sound characteristic analyzed at the input data analyzing section 211. For example, the display image 6B shows that in response to an input from the game player of sound source data representing reggae music, background data imaging such music has been selected so that the background environment has been changed to "southern island".

Figure 7:
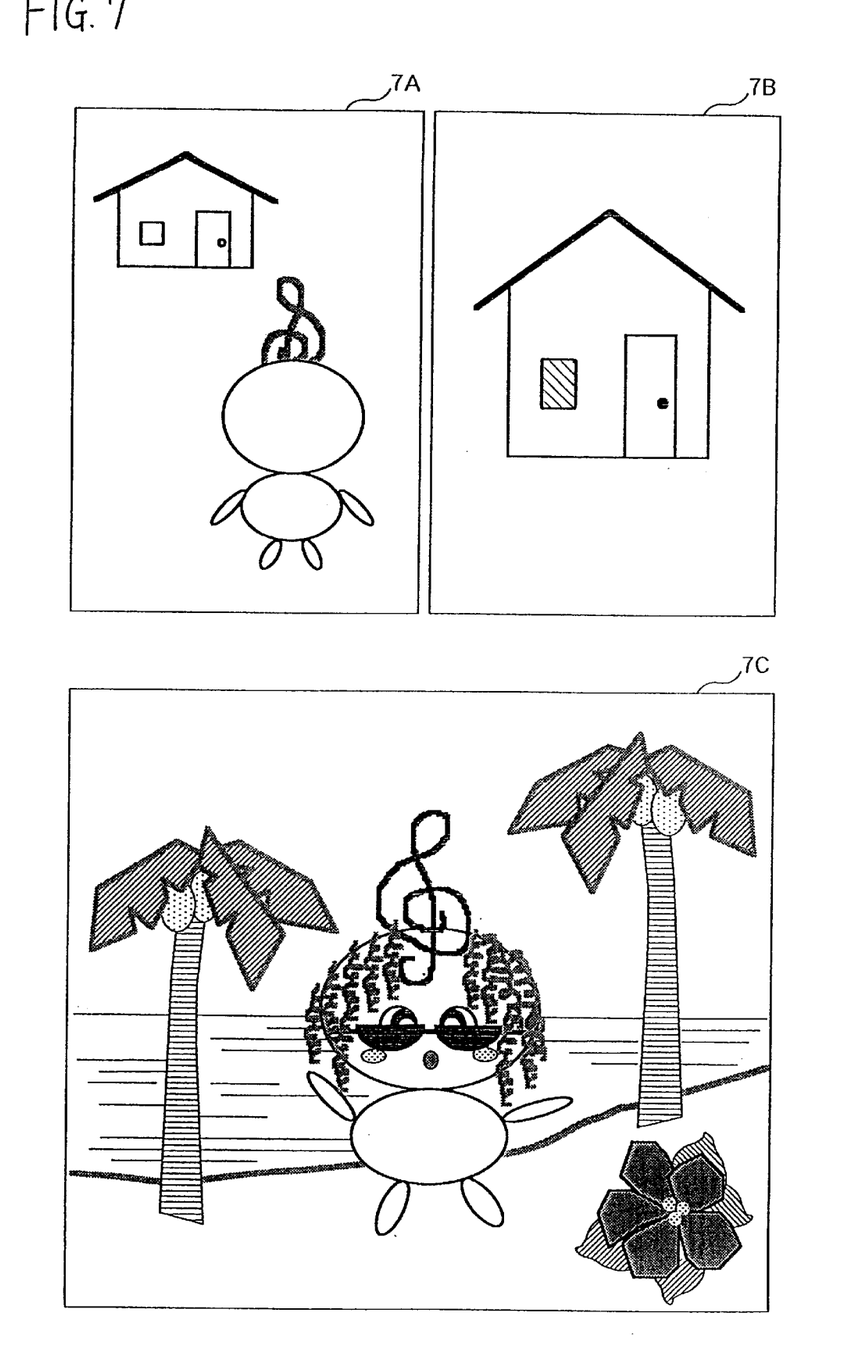
FIG. 7 is a diagram showing one example of a display image according to the first carrying-out mode.

Signs 7A and 7B in FIG. 7 denote a display image showing the state wherein a character is "bored". This display image is formed when, for example, the game player repeatedly uses sound source data representing particular music preset by the game player (music set upon initial setting) or when the foregoing signal waveform extremely differs from the reference signal.

The formation of this display manner is achieved when the input data analyzing section 211 detects the state wherein particular sound source data is repeated a preset number of times and outputs a result thereof to the character managing section 216. The display images 7A and 7B show an example wherein the character is tired of the repeated same sound source data thereby to go and stay at home.

A display image 7C in FIG. 7 shows a display image wherein the character and the background environment are displayed in a superimposed fashion. In this example, the display image is formed when a signal waveform of the inputted "reggae" sound source data agrees with a preset signal waveform or when sound source data from the game player resembles a preset signal waveform more than a set level. In this example, the character is dancing with behavior imaging such music in the background environment of sign 6B. With this display manner, the game player can objectively see a tendency of taste of the game player about music.

The character images and the background environment images shown in the display images 5A to 7C in FIGS. 5 to 7 are not limited to those examples, but can be freely modified in consideration of presentation for enhancing attractiveness to the game player in the growth process of the character. Specifically, it may be arranged that by systematically relating characters and background information to explicit designation from the game player, types of sound source data and so on in advance, a corresponding display image is displayed in a corresponding manner. With this arrangement, the game player can enjoy visual changes of the character and the background environment in the character growth process which is diversified in real time based on inputted sound source data.

Further, in the video game apparatus 2 of this carrying-out mode, such a game manner is made possible to cause the growth degrees of a plurality of characters to compete with each other. For example, a dance tournament for competition of dancing ability being one of growth factor data of a character is planned, and a past dancing ability of each of the characters cultivated in the growth process is visualized so as to be evaluated objectively.

As described above, in the video game apparatus 2 of this carrying-out mode, the highly attractive character growing game which reflects the taste of the game player can be realized by sequentially changing expression figures etc. of a character according to sound source data.

(Second Carrying-out Mode)

Now, an example of a video game apparatus is given wherein motion and expression of a character displayed on the display unit 25, i.e. the contents of animation, are changed upon occasion according to sounds the game player listens to.

A structure of the video game apparatus for realizing it is basically the same as the game apparatus 2 of the first carrying-out mode shown in FIG. 2, but the following data, table and functions are added.

Plural kinds of animation data, i.e. data for expressing at least one of motion and expression of a character, are prepared in the character data file 217, and an animation table for allocating sound characteristics per character is stored.

A sound characteristic analyzing function of detecting a sound characteristic of inputted sound source data, particularly rhythm or track length, is added to the input data analyzing section 211.

A data calling function of calling animation data based on the animation table according to an analyzed sound characteristic or a character selected from a plurality of characters by the game player is added to the character managing section 216.

An image control function of reflecting the contents of animation data on an expression manner of a character is added to the image managing section 220.

<Animation Data>

Animation data is classified into a plurality of groups per kind such as motion or expression of a character, and ranked per group or per class. It is arranged that as the rank becomes higher, animation data for forming bigger motion or more diversified expression is called. Calling of animation data is carried out at random from the group or class according to parameters peculiar to each character stored in the animation table.

<Animation Table>

As the parameters peculiar to each character stored in the animation table, there are, for example, a favorite musical piece time predetermined per character, a favorite rhythm band, a musical piece climax and a dancing level. These parameters can be updated if necessary.

"Favorite musical piece time" represents a scheduled time of reproduction for musical piece sound source data uniquely allocated per character selected by the game player, such as 30 seconds, 60 seconds, 90 seconds . . . . Thus, a favorite musical piece time of a character allocated 60 seconds is 60 seconds. Animation data is called from a group or class of a rank corresponding to this favorite musical piece time. Specifically, if a favorite musical piece time of a character selected by the game player is equal to a track length of a musical piece to be actually reproduced, animation data of a rank based on a predetermined ranking factor (coefficient 1) is set to be called, otherwise animation data of a rank lower than a predetermined rank is called. In the latter case, the intrinsic motion or expression of a character is not reproduced.

Similarly, "favorite rhythm band" represents a rhythm band uniquely allocated per character selected by the game player. In this carrying-out mode, one of a fist rhythm band where one beat is 10/30 seconds to 13/30 seconds, a second rhythm band where one beat is 14/30 seconds to 17/30 seconds, and a third rhythm band where one beat is 18/30 seconds to 24/30 seconds, is allocated to each character. When a musical piece reproduced based on sound source data is a favorite rhythm band to a character being displayed, a ranking factor (coefficient) is increased or a point is added to "dancing level" so as to achieve big motion or diversified expression. If it is not a favorite rhythm band, the intrinsic motion or expression of a character is not obtained as in case of the favorite musical piece time. On the other hand, if a musical piece being reproduced is other than the foregoing first to third rhythm bands, a process of rounding to the closest rhythm band is implemented.

"Musical piece climax" represents parameters which are, depending on an actual track length of a musical piece being reproduced and a favorite musical piece time allocated to a character being displayed, allocated to the whole musical piece for increasing/decreasing an image display effect. Specifically, the parameters are in the form of points "0" to "2" or the like which change by stages in a predetermined order every time a given time elapses and which become ranking factors. For example, assuming that a track length of a reproduced musical piece is 60 seconds and that a favorite musical piece time of a character being displayed is also 60 seconds, it may be arranged that, for example, a point of "1" is obtained after a lapse of 5 seconds, "0" after a lapse of 10 seconds, "1" after a lapse of 20 seconds, "2" after a lapse of 35 seconds, "1" after a lapse of 45 seconds and "0" after a lapse of 59 seconds. The allocation of these points is set so as to be optimum to the favorite musical piece time. Thus, if a track length of a reproduced musical piece disagrees with a favorite musical piece time, an increment of points per musical piece is set to be smaller. The points are reflected on "dancing level" upon occasion.

"Dancing level" represents a parameter indicating the degree of a change in motion of a character or diversification of expression thereof and is set to be increased based on the sum of the foregoing respective points. When the sum is increased, animation data of a rank corresponding thereto is called so that character images with big motion and diversified expression are displayed. The motion or the like of the character based on the dancing level changes by stages. In this example, the dancing level is set to be increased to a maximum of 8 levels, but the number of the levels may be set voluntarily.

The animation data ranks and the ranking factors of the favorite musical piece time, the favorite rhythm band, the musical piece climax and the rhythm level may be set by the game player. However, in consideration of the game attractiveness, it is preferable to set them secretly.

[Display Control 2 of Character etc.]

A display control method implemented by the game apparatus in the second carrying-out mode becomes as follows:

One of a plurality of characters is selected and displayed on the display unit 25. The selection manner of the character is the same as that of the game apparatus in the first carrying-out mode.

Every time the game player listens to a musical piece, a sound characteristic of sound source data (musical piece data) corresponding to the musical piece is detected, and animation data of a rank corresponding to the degree of agreement between the detected sound characteristic and the parameters is called so as to change a display manner of a character image in the display unit 25 according to the called animation data.

With this arrangement, for example, according to the beat and rhythm of a commercial music CD, an image of a character with motion and expression corresponding to the dancing level and the degree of climax at that time can be displayed to realize an attractive display manner.

[Third Carrying-out Model]

Now, an example is given wherein in the video game apparatus of the second carrying-out mode, various effect expressions are added to a display manner of a character or background environment at a voluntary time point depending on the state of a point gain or an accumulated time of reproduction of a musical piece.

A video game apparatus for this is realized by adding to the video game apparatus in the second carrying-out mode, a visual effect (VE) module for forming given effect images, a sound effect (SE) module for producing given effect sounds, a condition judging module for judging a startup condition of the VE module etc., an allocating module for presenting an item corresponding to the VE module etc. to the game player when the condition is matched and for allocating startup data for starting the VE module etc. to non-used keys of an input device, such as the controller 52, selected by the game player following the item presentation, and a control module for starting the VE module etc. at a voluntary time point when a command is inputted via the input device, so as to form a display manner on which corresponding effect expressions are reflected.

A judging factor for the condition matching in the condition judging module can be set voluntarily. However, in this carrying-out mode, it is one of an accumulated value of the points of "dancing level" in the animation table and an accumulated time of reproduction of a musical piece. Judgment on the condition matching is made depending on whether the accumulated value or the like has reached a certain set value. The set values are provided in stages and, when the condition is matched at each stage, data representing it is outputted.

The VE module etc. are provided with effect expressions for plural stages, respectively. For example, the SE module produces a celebratory sound or a musical piece whose reproduction time is prolonged by stages as the foregoing accumulated value or the like increases. The VE module also changes a background environment image from normal one or from one at the previous stage as the foregoing accumulated value or the like increases. As a changing manner example, it is considered to increase luminous energy of a background environment image, turn on and off, change colors thereof, pattern it more gorgeously or cause a special character image to appear.

[Display Control 3 of Character etc.]

A display control method implemented by the video game apparatus in this carrying-out mode becomes as follows:

First, one of a plurality of characters is selected and image-displayed on the display unit 25. The selection manner of the character is the same as that of the game apparatus in the first carrying-out mode.

During operation, every time the game player listens to a musical piece, a reproduction time of the musical piece is accumulated and it is judged whether the accumulated time has reached a preset time of each stage. When a scene comes where the VE module etc. can be started at each stage, an item representing it is displayed in the display unit 25. When selection of the item in question by the game player is detected, an image for commanding setting of a button for starting the VE module corresponding to the item is presented. Among buttons of the controller 52, the game player voluntarily designates on the setting command image a button other than those for music searching, pausing, display switching and others which are used while playing. When this is detected, startup data for starting the VE module etc. is allocated to the button designated by the game player.

This allows the game player to enjoy a display manner and effect sounds with effect expressions reflected thereon, by pushing that button during reproduction of a music CD or at a voluntary time point after the reproduction.

As described above, according to the present invention, for example, a display manner of a character can be changed upon occasion based on music or the like being highly general entertainment, so that it is possible to provide a video game apparatus for users of wide range irrespective of ages and sexes.

The description of the present invention is as given above. On the other hand, by loading a storage medium of the present invention, the present invention can be carried out not only on a video game apparatus, but also, for example, on a sound processing apparatus using CG images or a personal computer. In case of the sound processing apparatus, it is arranged that, for example, a character image is selected per game player, and the selected character image and a background environment image are displayed on a part of a screen while the game player is singing. In this case, the character image changes using, as factors, sound characteristics of musical piece data selected by the game player and voice data of the game player's singing. Further, by displaying a character image based on a singing skill of the game player while also using a known singing skill rating function, a more entertaining singing play apparatus can be realized.

INDUSTRIAL APPLICABILITY

As clear from the foregoing description, according to the present invention, since an expression manner of an image changes according to a sound characteristic of sound source data, attractiveness of a video game apparatus, a singing play apparatus or the like is largely enhanced. Further, diversified CG images can be displayed while suitably switching them following sound source data.

What is claimed is:

1. A character display control apparatus which image-displays on a given display unit a growth process of a character which grows according to a sound characteristic such as a sound type, sound magnitude, rhythm or tune, said display control apparatus comprising:

a data holding means for holding growth factor data quantitatively representing a growth degree of a figure expression ability peculiar to the character;

a data input means for inputting sound source data;

a detection means for detecting a sound characteristic of the sound source data every time the sound source data is inputted;

a data updating means for, according to the detected sound characteristic, cumulatively updating the growth factor data of the character being displayed on said display unit; and a control means for, based on the updated growth factor data, continuously changing an expression figure of the character being displayed.

2. The display control apparatus according to claim 1, wherein the character to be displayed is one of a plurality of characters which are selectable based on identification information peculiar thereto, and that said data holding means is capable of identifying, when one of the characters is selected, growth factor data peculiar to said selected character.

3. The display control apparatus according to claim 2, wherein said data holding means includes an exchangeable memory storing the growth factor data per character and is capable of identifying the corresponding growth factor data from said memory.

4. The display control apparatus according to claim 1, wherein said data input means is capable of selectively inputting one of plural kinds of sound source data recorded in advance in the apparatus.

5. The display control apparatus according to claim 1, wherein said detection means detects the sound characteristic by identifying a peak portion of a signal waveform of the sound source data, sampling it and applying a given arithmetic process to the sampled waveform.

6. The display control apparatus according to claim 5, wherein said detection means identifies a frequency characteristic by said arithmetic process and detects the sound characteristic based on said frequency characteristic.

7. The display control apparatus according to claim 1, wherein when the detected sound characteristic is the same as one already held, said data updating means accumulates a continued time of the sound characteristic and changes the growth factor data in sequence according to said continued time or an accumulated time thereof.

8. The display control apparatus according to claim 1, wherein the sound characteristic and the growth factor data are composed of plural kinds of data distinguishable from each other, and that said data updating means changes in sequence growth factor data of a kind corresponding to a kind of a detected sound characteristic.

9. The display control apparatus according to claim 1, further comprising a background environment image managing means for relating background data for changing background environment of the character displayed on said display unit to the growth factor data of said character and for displaying on said display unit an image of the background environment based on the background data corresponding to the growth factor data upon expressing the figure of the character based on the growth factor data.

10. A character display control apparatus comprising:

an animation data storage means for storing animation data for image-expressing at least one of motion and expression of each of a plurality of characters which are selectively displayed on a given display unit, said animation data classified into a plurality of ranks;

an allocating means for allocating a parameter to each of said plurality of characters, said parameter peculiar to each character and relating to a sound characteristic;

a data input means for inputting sound source data;

a detection means for detecting a sound characteristic of the sound source data every time the sound source data is inputted;

a character selecting means for selecting one of said plurality of characters based on a given command;

a data reading means for determining a rank corresponding to a degree of agreement between the parameter allocated to the selected character and the detected sound characteristic and for calling the animation data corresponding to said rank from said animation storage means; and a control means for controlling an expression manner of an image of the character displayed on said display unit based on the read animation data, wherein the motion or expression of the displayed character is changed according to the sound characteristic.

11. The display control apparatus according to claim 10, wherein said animation data storage means stores a plurality of animation data per rank, and that said data reading means reads the animation data of each rank at random.

12. The display control apparatus according to claim 10, wherein said allocating means updates a ranking factor based on said degree of agreement, and said data reading means determines the rank based on said ranking factor.

13. A character display control method implemented in an apparatus which image-displays on a given display unit a growth process of a character which grows according to a sound characteristic such as a sound type, sound magnitude, rhythm or tune, said method comprising:

holding a growth factor data quantitatively representing a growth degree of a figure expression ability peculiar to each of characters to be displayed; detecting a sound characteristic of sound source data every time the sound source data is inputted into said apparatus;

cumulatively updating, according to the detected sound characteristic, the growth factor data of the character being displayed on said display unit; and continuously changing an expression figure of said character based on the updated growth factor data.

14. The display control method according to claim 13, wherein the contents of the growth factor data of each character are changed in sequence based on at least one of a continued time of the same sound characteristic, an accumulated time of the same sound characteristic and an input frequency of sound source data having the same sound characteristic.

15. The display control method according to claim 13, wherein said sound source data is musical piece data representing a feature of a music sound and/or voice data representing a human uttered sound, and that said sound characteristic is determined according to a type of the sound source data.

16. The display control method according to claim 13, including relating background data for changing background environment of the displayed character to the growth factor data of said character, and displaying on said display unit the background environment corresponding to the growth factor data of said character based on said background data upon image-expressing the figure of the character image.

17. A character display control method for a plurality of characters which are selectively displayed on a given unit, said display control method comprising:

classifying animation data groups for image-expressing at least one of motion and expression of each character into a plurality of different ranks, holding them and allocating a parameter to each of said plurality of characters, said parameter peculiar to each character and relating to a sound characteristic; and detecting, upon every input of sound source data, a sound characteristic of the sound source data, calling the animation data of a rank corresponding to a degree of agreement between the detected sound characteristic and the allocated parameter, and changing a display manner of the character on said display unit according to said animation data.

18. The display control method according to claim 17, wherein a plurality of animation data are prepared per rank and that these animation data are called at random.

19. The display control method according to claim 17, further comprising updating a ranking factor based on said degree of agreement, and determining said rank based on said ranking factor.

20. The display control method according to claims 19, wherein said ranks and said ranking factor are set secretly.

21. A storage medium storing program codes to be read and executed by a computer having a means for displaying on a given display unit an image of a character which grows according to a sound characteristic such as a sound type, sound magnitude, rhythm or tune and an image of background environment thereof, and a means for inputting sound source data, said program codes causing said computer to execute:

a process of holding growth factor data quantitatively representing a growth degree of a figure expression ability peculiar to the character;

a process of cumulatively updating, upon every input of sound source data, said held growth factor data according to a sound characteristic of the sound source data; and a process of continuously changing an expression figure of the character displayed on said display unit based on the updated growth factor data.

22. A storage medium storing program codes to be read and executed by a computer having a means for selectively displaying a plurality of characters on a given display unit and a means for inputting sound source data, said program codes causing said computer to execute:

a process of classifying animation data groups for image-expressing at least one of motion and expression of each of said plurality of characters into a plurality of different ranks, and holding them;

a process of allocating a peculiar parameter relating to a sound characteristic to each character;

a process of detecting, upon every input of sound source data, a sound characteristic of the sound source data, and calling the animation data of a rank corresponding to a degree of agreement between the detected sound characteristic and the allocated parameter; and a process of changing motion or expression of the character displayed on said display unit to a manner corresponding to the called animation data.

* * * * *